United States Patent
Charier et al.

(10) Patent No.: US 12,152,538 B2
(45) Date of Patent: Nov. 26, 2024

(54) TURBOMACHINE COMPRISING A REAR INTEGRATED ELECTRICAL MACHINE

(71) Applicant: SAFRAN AIRCRAFT ENGINES, Paris (FR)

(72) Inventors: Gilles Alain Marie Charier, La Grande Paroisse (FR); Romain Truco, Moissy-Cramayel (FR); Julien Fabien Patrick Becoulet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/561,811

(22) PCT Filed: May 23, 2022

(86) PCT No.: PCT/FR2022/050970
§ 371 (c)(1),
(2) Date: Nov. 17, 2023

(87) PCT Pub. No.: WO2022/248798
PCT Pub. Date: Dec. 1, 2022

(65) Prior Publication Data
US 2024/0229723 A1 Jul. 11, 2024

(30) Foreign Application Priority Data
May 27, 2021 (FR) .................................. 21 05516

(51) Int. Cl.
*F02C 7/36* (2006.01)
*F01D 25/18* (2006.01)
*F02C 7/06* (2006.01)

(52) U.S. Cl.
CPC ............ *F02C 7/36* (2013.01); *F01D 25/18* (2013.01); *F02C 7/06* (2013.01)

(58) Field of Classification Search
CPC ............................... B64D 31/18; B64D 27/33
See application file for complete search history.

(56) References Cited

U.S. PATENT DOCUMENTS 3,703,076 A * 11/1972 Hagemeister ............. F02C 7/36
 415/60
2006/0137355 A1 * 6/2006 Welch ................... H02K 7/1823
 60/802

(Continued)

FOREIGN PATENT DOCUMENTS

EP 3 246 528 A1 11/2017
EP 3 613 977 A1 2/2020

(Continued)

OTHER PUBLICATIONS

International Search Report and Written Opinion issued Jul. 21, 2022 in PCT/FR2022/050970 filed on May 23, 2022, 16 pages (with English Translation).

(Continued)

*Primary Examiner* — Gerald L Sung
(74) *Attorney, Agent, or Firm* — Oblon, McClelland, Maier & Neustadt, L.L.P.

(57) ABSTRACT

A turbomachine including a low-pressure shaft; a stator supporting the low-pressure shaft by bearings including a rear bearing; an electrical machine located at a rear portion of the turbomachine and including a rotor disconnectably driven by the low-pressure shaft and a stator surrounding the rotor and attached to the stator of the turbomachine; the turbomachine includes a journal for supporting the rotor of the electrical machine, the journal including a shaft segment releasably attached to a rear end of the low-pressure shaft by extending the low-pressure shaft, a frame to which the rotor of the electrical machine is attached and which surrounds the shaft segment, and at least one bearing mounted between the frame and the shaft segment; and a sleeve that is axially (Continued)

movable about the low-pressure shaft and/or the shaft segment that is rotationally connected to the low-pressure shaft and the shaft segment.

12 Claims, 4 Drawing Sheets

(56) References Cited

U.S. PATENT DOCUMENTS

| | | | | |
|---|---|---|---|---|
| 2010/0156113 A1* | 6/2010 | Lemmers, Jr. | ............ | F02C 7/32 192/84.1 |
| 2013/0145769 A1* | 6/2013 | Norris | ........................ | F02C 7/32 60/722 |
| 2017/0334377 A1 | 11/2017 | Klemen et al. | | |
| 2017/0335710 A1 | 11/2017 | Klemen et al. | | |
| 2017/0335713 A1 | 11/2017 | Klemen et al. | | |
| 2017/0335795 A1 | 11/2017 | Klemen et al. | | |
| 2018/0051701 A1* | 2/2018 | Kupiszewski | ......... | H02K 7/116 |
| 2019/0085715 A1* | 3/2019 | van der Merwe | ...... | F02C 3/067 |
| 2020/0063606 A1 | 2/2020 | Miller et al. | | |
| 2020/0290744 A1 | 9/2020 | Spierling | | |
| 2021/0079850 A1 | 3/2021 | Davies | | |
| 2021/0119511 A1* | 4/2021 | Bloor | ........................ | F16D 3/06 |
| 2022/0176900 A1 | 6/2022 | Klemen et al. | | |

FOREIGN PATENT DOCUMENTS

| | | |
|---|---|---|
| EP | 3 708 787 A1 | 9/2020 |
| EP | 3 763 929 A1 | 1/2021 |
| FR | 3 073 569 A1 | 5/2019 |

OTHER PUBLICATIONS

French Preliminary Search Report and Written Opinion issued Dec. 21, 2021 in French Application 21 05516 filed on May 27, 2021, 10 pages (with English Translation of Categories of Cited Documents).

* cited by examiner

TURBOMACHINE COMPRISING A REAR INTEGRATED ELECTRICAL MACHINE

The present invention relates to a turbomachine, in which an electrical machine is integrated at the rear.

This electrical machine can be a simple electric generator, or a reversible machine that can also operate as an electric motor; it is added to the electrical machine traditionally placed on a gearbox at the periphery of the turbomachine to provide it and other aircraft equipment with the electrical power they need. Such an exemplary turbomachine, comprising a rear integrated electrical machine, is described in the document FR 3 027 625 A1.

The integration of such an electrical machine at the rear of the turbomachine poses a number of difficulties. First of all, the temperature is very high and the electrical machine therefore has to be thermally protected.

EP 3613977 A1 describes an electrical machine at the rear of a turbomachine that can be removed from the turbomachine in modules, which seems to make this document the closest one to the invention.

EP 3763929 A1 describes mounting an electrical machine at the end of a turbomachine high-pressure shaft, wherein the rotor of the electrical machine is mounted on a sliding shaft end that extends the high-pressure shaft.

FR 3073569 A1 describes an electrical machine mounted on a propeller shaft of a turboprop, with a disengageable rotor.

EP 3246528 A1 and EP 3708787 A1 describe other turbomachines fitted with electrical motors.

The layout constraints are considerable as space is reduced.

Dynamic balancing of rotating bodies is very complicated for the following reasons. Firstly, it is advantageous for the rotor of the electrical machine to be driven by the shaft of the turbomachine that extends furthest back and stops in front of the machine, i.e. the low-pressure shaft; a simple coupling could then be envisaged. But the rotor makes the low-pressure shaft even heavier, especially as it is cantilevered behind the bearings that support it. These consequences are all the more striking given that current developments in aircraft engines are leading to a move towards miniaturisation, i.e. a reduction in the diameters of high- and low-pressure shafts. It should be added that the rotor of the electrical machine cannot in reality be directly mounted on the low-pressure shaft as it has to be able to be uncoupled from it in certain fault situations, for example short circuits, particularly when the electrical machine is a permanent magnet machine. It is therefore necessary to add a decoupling device between the low-pressure shaft and the rotor of the electrical machine, and to have the rotor supported by independent bearings. This makes the system heavier, and the problems of layout and withstanding dynamic stresses are likely to become more acute. The additional bearings and the decoupling device themselves have to withstand the high temperatures they experience.

Finally, it would be desirable for the electrical machine and its associated parts to be easily removable from the rest of the turbomachine in order to enable straightforward replacements.

The invention covers several measures that make it possible, separately and when combined, to reduce or eliminate the abovementioned difficulties. The arrangement obtained at the rear of the turbomachine is relatively simple, compact, easy to dismantle and causes relatively little disruption to the dynamic equilibrium of the low-pressure shaft, so there is little risk of excessive heating.

In a general form, which already provides these advantages, the invention thus relates to a turbomachine comprising a low-pressure shaft extending along an axis of the turbomachine which defines a front and a rear; a turbomachine stator supporting the low-pressure shaft by bearings including a rear bearing; an electrical machine located at a rear portion of the turbomachine and comprising a rotor disconnectably driven by the low-pressure shaft, and a stator attached to the stator of the turbomachine; comprising a journal for supporting the rotor of the electrical machine, comprising a shaft segment releasably attached to a rear end of the low-pressure shaft by extending the low-pressure shaft, a frame to which the rotor of the electrical machine is attached and which surrounds the shaft segment; characterized in that the stator of the electrical machine surrounds the rotor of the electrical machine; and in that the turbomachine also comprises at least one bearing mounted between the frame and the shaft segment; and a sleeve that is axially mobile about the low-pressure shaft and/or the shaft segment (i.e. it is axially mobile around only one of them or both) that is rotationally connected to the low-pressure shaft and the shaft segment, and provided with rearwardly extending coupling means capable of being engaged with forwardly extending complementary coupling means of the frame.

The term "low-pressure shaft" is used here to refer to a shaft associated with the rotation of a turbine at the very rear of the turbomachine, and which therefore extends further back than other possible shafts such as a high-pressure shaft.

The components of the electrical machine can be placed in a cavity at the rear of the turbomachine, into which the end of the low-pressure shaft opens and which is closed at the rear by a conical cover. The bearing journal of the turbomachine rotor forms a unitary assembly that can be easily attached to the end of the low-pressure shaft, and the machine stator can be attached to the turbomachine stator, with virtually no change to the design of existing turbomachines without the electrical machine. The extension of the low-pressure shaft due to the addition of the shaft segment, and the rotor overhang, are moderate. The bearing(s) integrated into the journal can easily be lubricated by a stand-alone device, separate from the lubrication devices used for the support bearings of the low-pressure shaft and the high-pressure shaft, thus without further changing the existing lubrication circuits. The coupling sleeve that removably and rotatably connects the low-pressure shaft and the rotor of the electrical machine is compact and occupies, without difficulty of design, an empty volume still present around the end of the low-pressure shaft and behind the stator of the turbomachine. It is also easy to control, and does not cause major dynamic disturbances. And the various components (journal, coupling sleeve and stator of the electrical machine) can be easily dismantled.

Many improvements can be made to this general concept. First of all, it is advantageous when the bearing(s) is/are lubricated with grease, being contained in an enclosed lubrication chamber. Dynamic lubrication by forced oil circulation, as is usual for turbomachines, is not necessary for these particular bearings, which are inactive in the usual state of driving the rotor of the electric machine, in which the coupling sleeve secures the frame in rotation to the low-pressure shaft and the shaft segment. Rotation between the frame and the shaft segment only takes place in the event of failure of the electrical machine when uncoupling of the sleeve is ordered. Friction and heat is thus produced by the bearings arranged between the shaft segment and the rotor, but this state is generally short, and the heat produced is therefore not enough to cause significant damage. Such damage is likely to only affect the bearings, which can be easily replaced. And the surrounding heat produced during operation of the turbomachine is largely absorbed by the existing fluid cooling devices serving the parts adjacent to the journal: the heat generated remains moderate even in the absence of a special cooling device.

It is advantageous that the chamber can be supplied with grease regardless of the circumstances: it is therefore recommended that the shaft segment is hollow and contains a grease reservoir that communicates with the chamber via at least one hole.

This design can itself be improved. The grease of the reservoir can also help lubricate the coupling devices between the sleeve on the one hand, and the frame, low-pressure shaft or shaft segment on the other. The lubrication chamber is therefore delimited in part by these parts.

And since the grease reservoir is at a radial position closer to the axis than the devices to be lubricated, the grease is carried by the centrifugal forces to these devices.

The coupling devices can be networks of radially or axially oriented grooves, depending on whether the connection between the parts that they connect has to be interrupted or maintained during their axial movements from one state to the other.

According to another advantageous arrangement in terms of ease of layout, the turbomachine also comprises an actuator for the sleeve, which is housed axially between the turbomachine stator and the frame, and radially between the frame and the sleeve.

A simple and advantageous design of the actuator comprises at least one roller that is axially mobile and rotates freely about a radial axis, capable of abutting against a flat collar of the sleeve and of pushing back the collar.

In order to maintain the coupling between the sleeve and the frame except when its removal is ordered, the arrangement advantageously comprises a spring engaged around the low-pressure shaft, and compressed between the low-pressure shaft and the sleeve.

All these features are not associated with a significant increase in the size of the device.

Other potential improvements improve the modular dismantlability of the device associated with the electrical machine, and in particular the bearing journal of its rotor. It is firstly advantageous that the shaft segment is attached to the rear end of the low-pressure shaft by a nut.

Dismantling is therefore easy if the shaft segment contains a recess, the nut comprises protrusions for engagement by a tool which project into the recess, and the nut comprises an anti-rotation brake placed in the recess.

By combining this feature with one of the previous ones, according to which the shaft segment contains a grease reservoir, it is advantageously possible to match the recess with the reservoir, provide it with an opening at a rear end of the shaft segment and a cap that can be closed at will at the opening. All of these measures enable easy access to the nut securing the journal to the end of the low-pressure shaft during a maintenance operation, by inserting a tool into the recess, or the reservoir previously emptied of its content.

Alternatively, the reservoir could occupy only one peripheral part of the interior volume of the shaft segment in order to more easily access the securing nut, via the central part of the interior volume, which therefore remains empty.

And the ease of dismantling is complete if the journal can be separated from the low-pressure shaft and from the sleeve by sliding backwards, the sleeve is attached to the turbomachine stator by a first bolted flange that can be accessed from the rear, and the stator of the electrical machine is attached to the stator of the turbomachine by a second bolted flange that can be accessed from the rear.

To sum up, one important aspect of the invention is that the journal, the sleeve, the stator of the electrical machine, and the actuator when it is also present at the rear of the turbomachine, are formed as separate, unitary modules that can be successively dismantled from the turbomachine (and can be reassembled in the same way). Their modular, separate and unitary nature means that they form independent portions of the device, each of which is supplied or removed en bloc, that they are assembled to the rest of the turbomachine without necessarily being assembled together, and that they can be replaced separately.

The various aspects, features and advantages of the invention will now be described in more detail by means of the detailed description of the following figures, which show a particular embodiment, provided purely by way of illustration:

FIG. 1 schematically shows the rear of a turbomachine and the various components of the invention;

FIG. 2 shows its main components in more detail; and

FIG. 3 and

Figure 1:
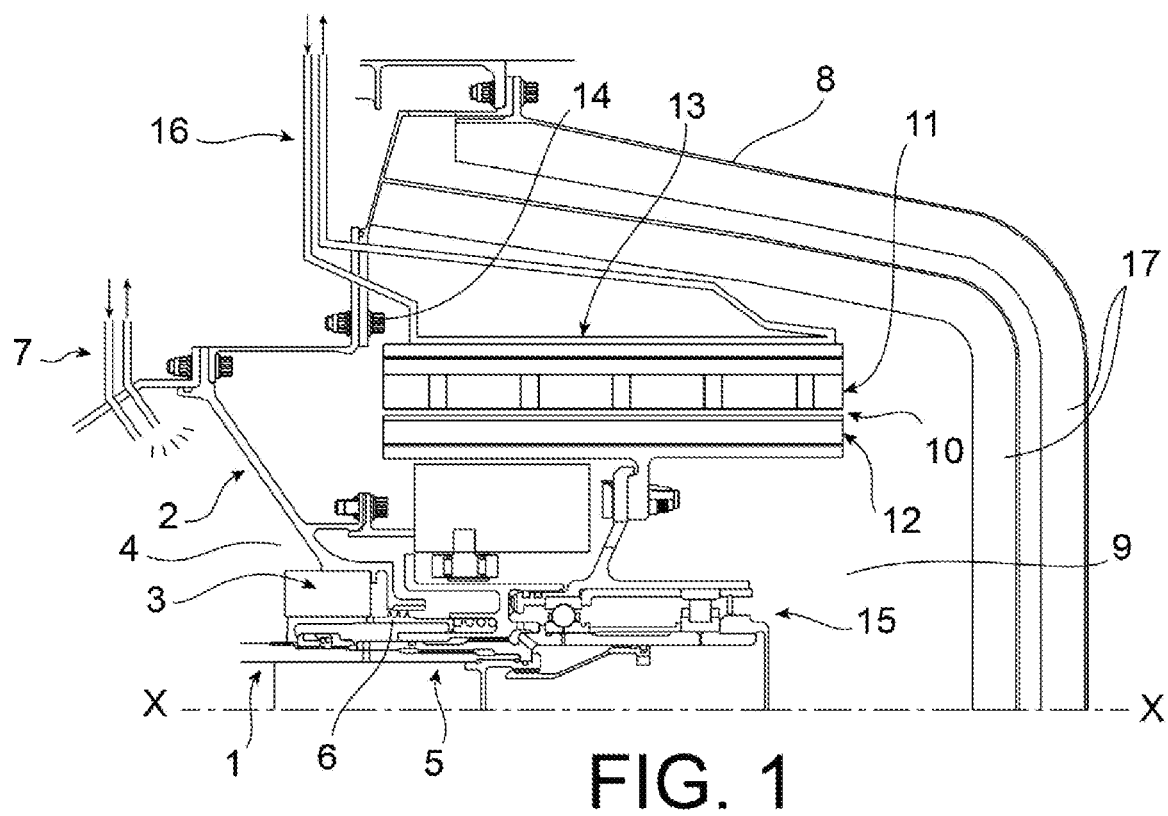
Figure 2:
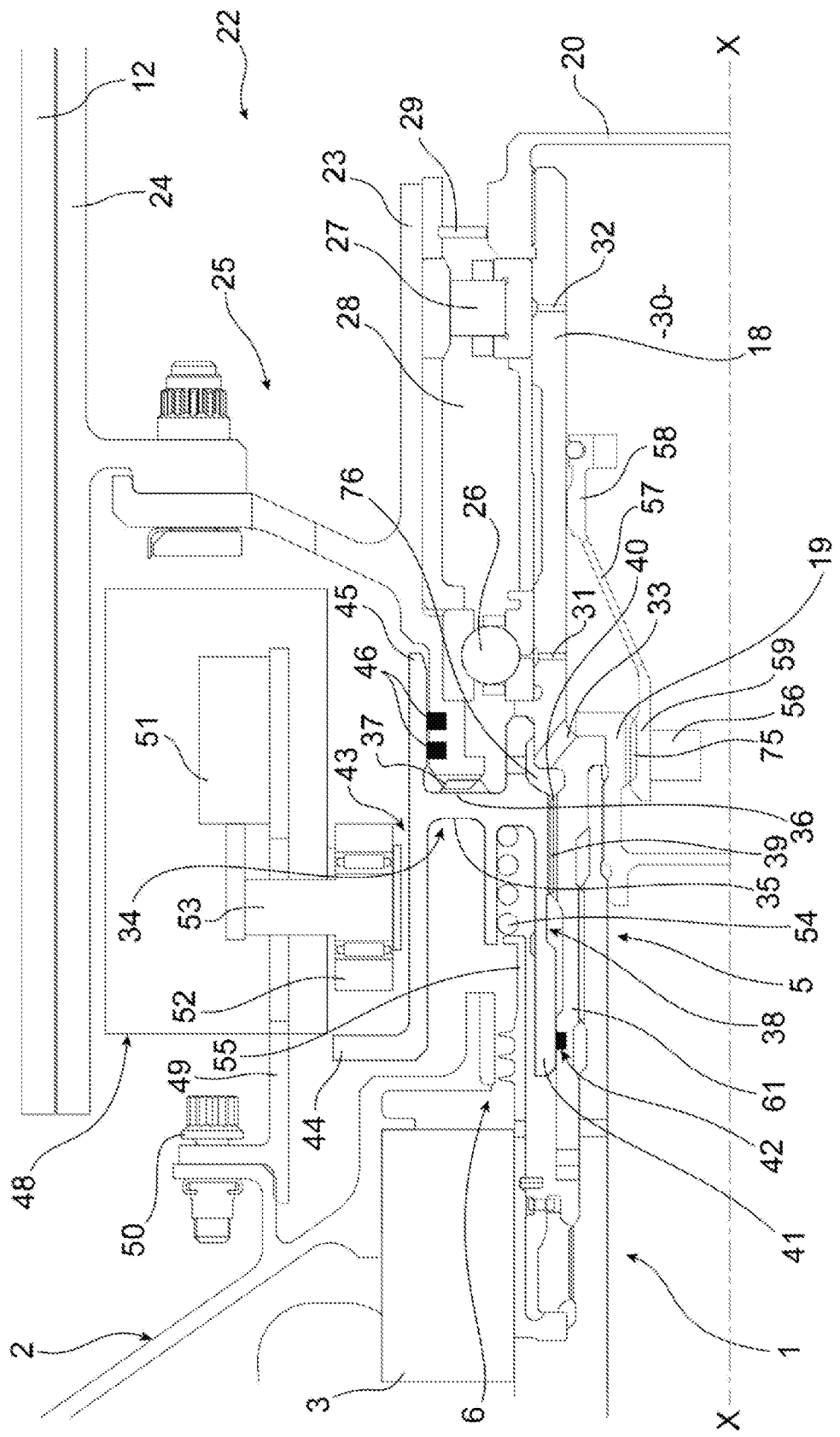
Figure 5:
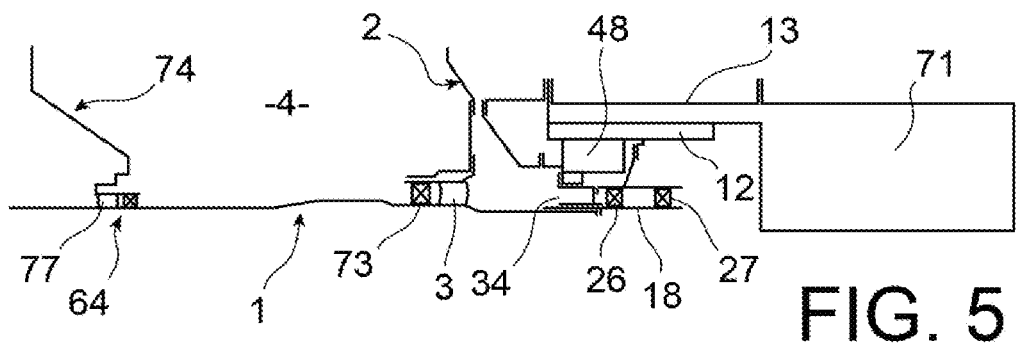
FIG. 5 shows an overall diagram of the device and its arrangement on the turbine.

The description first covers FIGS. 1 and 2. The turbomachine comprises a central axis X-X extending in a longitudinal direction, between a forward direction (on the left of the figures) and a backward direction (on the right of the figures). Only the rear part of the turbomachine near the X-X axis is shown as the rest of the turbomachine is not modified by the invention. The turbomachine comprises a low-pressure shaft 1 arranged along the axis X-X and rotating about this axis. It comprises a stator 2 wherein the low-pressure shaft 1 is supported by various bearings, including a rear bearing, which is the rearmost of the bearings by means of which the low-pressure shaft 1 is supported by the stator 2. The visible part of the stator 2 is specifically an exhaust housing of the turbomachine. The bearings, including the rear bearing, are contained in lubricated chambers delimited by the stator 2. The low-pressure shaft 1 has an end 5 which emerges from the rear lubricated chamber 4 containing the rear bearing, to the rear of a main seal 3 which delimits the rear lubricated chamber 4, through a circular opening of the stator 2 provided with a labyrinth seal 6 which complements the main seal 3. A lubrication circuit 7 (only shown schematically) passes through the rear lubrication chamber 4 and supplies the rear bearing 3 with oil in order to also dissipate the air that it produces. The rear bearing is shown in FIG. 5 with reference numeral 73. It is immediately in front of the main seal 3. The rear lubricated chamber 4 is closed at the front by another part 74 of the stator 2 and another assembly made up of a bearing 64 and a seal 77 connecting the low-pressure shaft 1 to said other part 74.

The turbomachine has an empty volume at the rear of the stator 2 near the axis X-X, in the rear cone of the turbine, and the end 5 opens out of the stator 2 at this point. The corresponding volume can be isolated from the outside by a conical cover 8 to form a rear cavity 9 that can accommodate various items of equipment, such as an electrical machine 10 comprising a stator 11 and a rotor 12 surrounded by the stator 11. The stator 11 consists here of electrical windings and the rotor 12 of permanent magnets, but other arrangements of the electrical machine would be possible. The stator 11 includes a rigid stator frame 13, attached to the stator 2 of the turbomachine by a first flange 14. The rotor 12 is supported by one of the main parts of the invention, the journal 15, which will be described in detail and which is supported by the end 5 of the low-pressure shaft 1. A cooling circuit 16, also only outlined, passes through the turbomachine stator 2 and dissipates the heat produced around the stator 11 of the electrical machine. And the rear cavity 9 is protected from the heat produced around it by the exhaust gases of the turbomachine, by insulating layers 17 in the inner lining of the conical cover 8.

The description now relates to the journal 15 with reference in particular to FIG. 2. It firstly comprises a shaft segment 18, which extends the low-pressure shaft 1 by a short distance behind its end 5, and which is attached to the end 5, coaxially with it, by a nut 19. The shaft segment 18 is hollow, in the form of a sleeve hollowed out around the axis X-X, but closed at the rear by a cap 20 screwed around its end. The nut 19 is housed (reference will also be made to FIGS. 3 and 4 for these descriptive details) in the recess of the shaft segment 18, is screwed into a threaded section 21 of the end 5, pushes back a shoulder 60 of the shaft section 18, causing it to abut against the rear face of the end 5. A forwardly extending sleeve 61 of the shaft segment 18 rests on the outer face of the end 5 and ensures the coaxiality of the end 5 and the shaft segment 18.

A frame 22 which supports the rotor 12 of the electrical machine 10 is arranged around the shaft segment 20. It includes an inner sleeve 23, an outer sleeve 24 and a pair of flanges 25, respectively integral with the sleeves, which are more or less flat and radial in orientation, and bolted together. The frame 22 thus forms a rigid structure. A rotary bearing, consisting here of a ball bearing 26 at the front and a roller bearing 27 at the rear, is arranged radially between the inner sleeve 23 and the shaft segment 18 to hold them together whilst enabling them to rotate. The positions of the bearings 26 and 27 in the direction of the axis X-X, relative to the shaft segment 18 and the inner sleeve 23, are guaranteed by systems of stops and spacers, which are shown in the drawings. A lubrication chamber 28 is formed between the shaft segment 18 and the inner sleeve 23. It includes the bearings 26 and 27; it is closed at the rear by a seal 29 placed between the inner sleeve 23 and the cylindrical wall of the cap 20; and it communicates with a reservoir 30 which is the hollow volume covered by the shaft segment 18 which extends, from back to front, from the cap 20 to the end 5. Communication is via holes 31 and 32 leading directly to the bearings 26 and 27; however, a main hole 33 connects the reservoir 30 to another part 76 of the lubrication chamber 28, located further forward and which we will come back to.

Another important element of the device is a coupling sleeve 34 which ensures switching between two states of the device. It comprises a flat, radially central main part 35 provided with rearwardly directed radial grooves 36 distributed around its circumference and which, in the usual position, mesh with corresponding forwardly directed radial grooves 37 located at the front of the inner sleeve 23. The coupling sleeve 34 also comprises a substantially cylindrical radially inner part 38, provided with axial grooves 39 on its inward facing face, and which mesh with axial grooves 40 located on the sleeve 61. The radially inner part 38 has a front bearing surface 41 which slides over the sleeve 61; a seal 42, located at this point, limits the lubrication cavity 28 at the front. Finally, there are other axial grooves 62 and 63, belonging respectively to the sleeve 61 and to the end 5, which mesh with each other and secure the shaft segment 18 and the low-pressure shaft 1 together in rotation.

The coupling sleeve 34 finally comprises a substantially cylindrical radially outer part 43, which comprises at the front a flare 44, close to the stator 2 of the turbomachine but separate from it, and at the rear a bearing surface 45 which slides over the outer face of the front of the inner sleeve 23; seals 46, positioned at this point, complete the isolation of the lubrication cavity 28 from the outside; the lubrication cavity 28 therefore also includes the radial grooves 36 and 37 and the axial grooves 39 and 40, which the grease lubricates.

An actuator 48 is arranged in the volume comprised radially between the coupling sleeve 34, more specifically its radially outer part 43, and the outer sleeve 24 of the frame 22, and it is comprised axially between the turbomachine stator 2 at the front and the flanges 25 at the rear. The actuator 48 is fitted with a support 49 held on the turbomachine stator 2 by a second flange 50 concentric with the first flange 14 and surrounded by it. It comprises motors 51, such as electric actuators, able to move forward rollers 52 rotating about radial axes 53 pushed by the motors 51. The motors 51 can be supplied with electricity or fluids via electrical wires or cables running along the stator 2 of the turbomachine.

A coil spring 54 is compressed between the main part 35 of the coupling sleeve 34 at the rear, and a sleeve 55, belonging to the low-pressure shaft 1 and to which one half of the labyrinth seal 6 belongs, at the front. The front bearing surface 41 has an annular external projection 72 or a seal (referred to in FIGS. 3 and 4) which restricts the gas leakage section that the front bearing surface 41 makes with said sleeve 55, to increase the sealing of the rear lubricated chamber 4.

Figure 3:
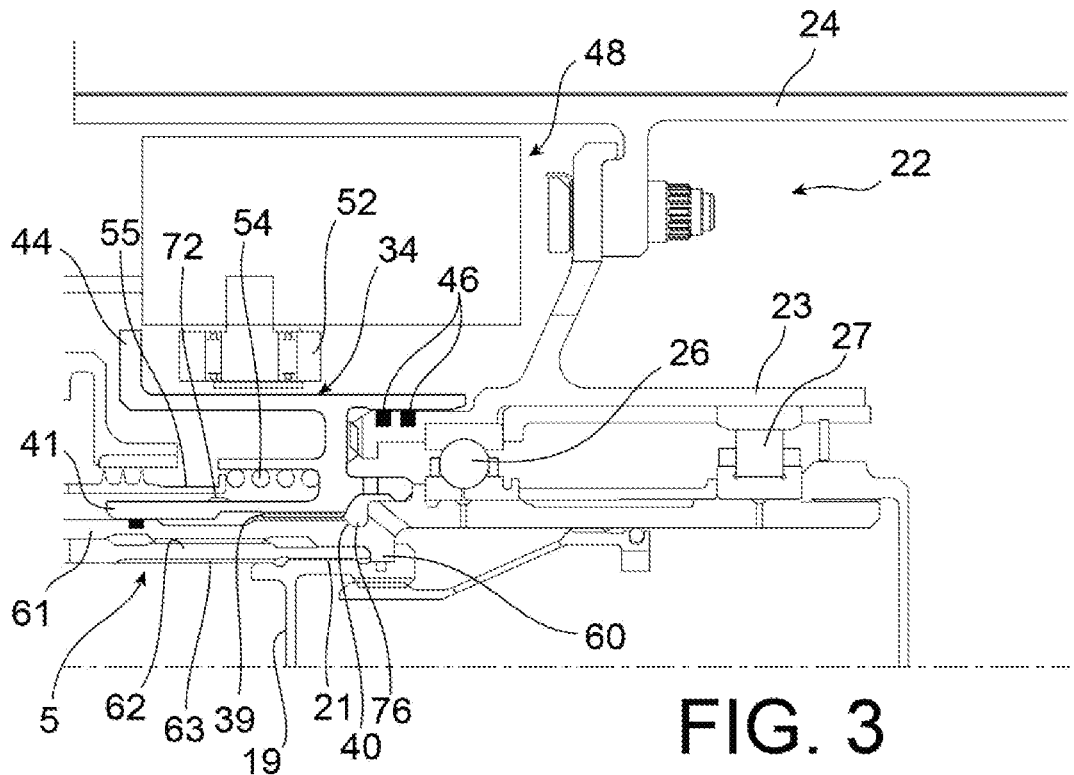

The main state of the device is that shown in FIGS. 2 and 3: the radial grooves 36 and 37 mesh with one another, the spring 54 pushes the coupling sleeve 34 backwards, and the frame 22, the low-pressure shaft 1, the shaft segment 18 and the coupling sleeve 34 rotate in unison and drive the rotor 12 of the electrical machine 10, which is therefore active.

Figure 4:
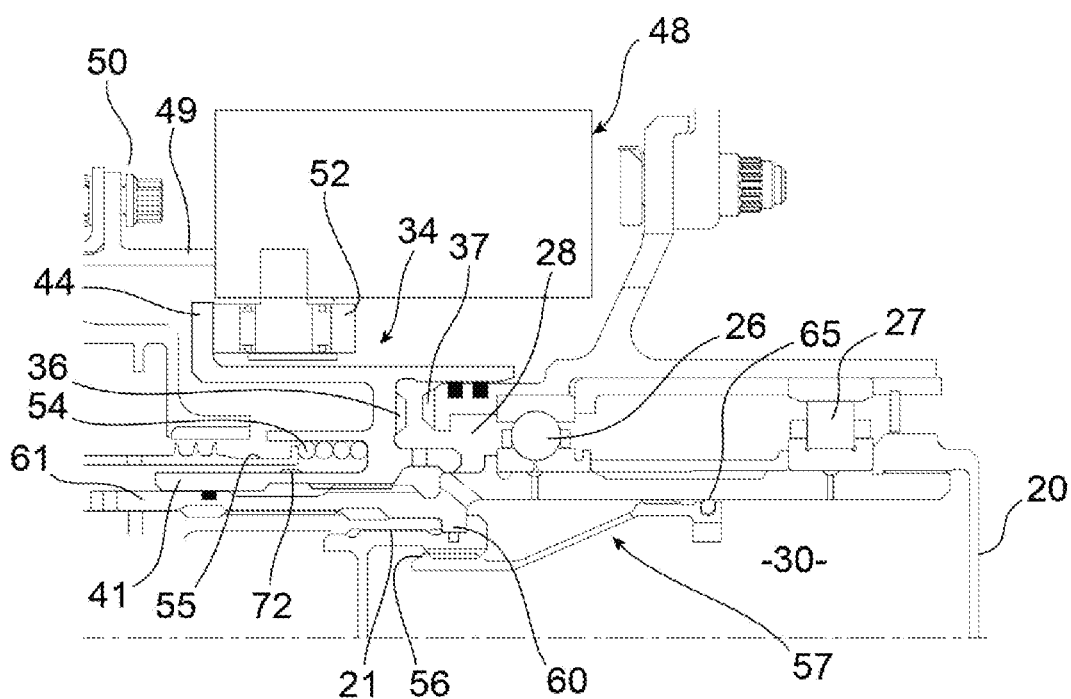
FIG. 4 show the two states of the device.

If, on the other hand (as shown in FIG. 4), the rotor 12 and the low-pressure shaft 1 are to be uncoupled by means of the actuator 48, the motors 51 are activated to move the rollers 52 against the collar 44 and push it forwards, thereby disengaging the radial grooves 36 and 37 and allowing the frame 22 and the rotor 12 to rotate at a different speed from the low-pressure shaft 1. The bearings 26 and 27 start moving and cause the grease to circulate through the holes 32 and 33. The bearing surfaces 41 and 45 keep the lubrication cavity 28 closed despite their sliding movements and the axial grooves 39 and 40 continue to mesh with one another. When the motors 51 are released, the spring 54 safely returns the coupling sleeve 34 to its normal position.

Dismantling for maintenance purposes or to replace elements of the system is easy once the conical cover 8 has been removed. It is carried out by removing each module of the device one after the other including the stator 11 of the electrical machine 10, the journal 15, the actuator 48 and the coupling sleeve 34. The operator remains in the same position. The stator 11 of the electrical machine 10 is first dismantled by removing the first flange 14. The cap 20 is then unscrewed, the reservoir 30 emptied of its grease, and a tool inserted towards the front to turn the bolt 19, resting on radially inner protrusions 56 projecting inside the reservoir 30. The journal 15 is then removed from the end 5 of the low-pressure shaft 1. The actuator 48 is then removed by dismantling the second flange 50. The coupling sleeve 43 can then also be dismantled simply by pulling it. All movements are made in a straight line towards the rear.

The reservoir 30 contains a brake 57 for the nut 19, consisting of a flexible rod, a rear end 58 of which is stopped against the inner wall of the shaft segment 18 by the engagement of an elastic seal 65 in a groove, and the front end 59 of which comprises axial grooves 75 engaged in complementary grooves of the nut 19. The flexible rod is bent before the nut 19 is turned to disengage it from the front end 59.

Figure 6:
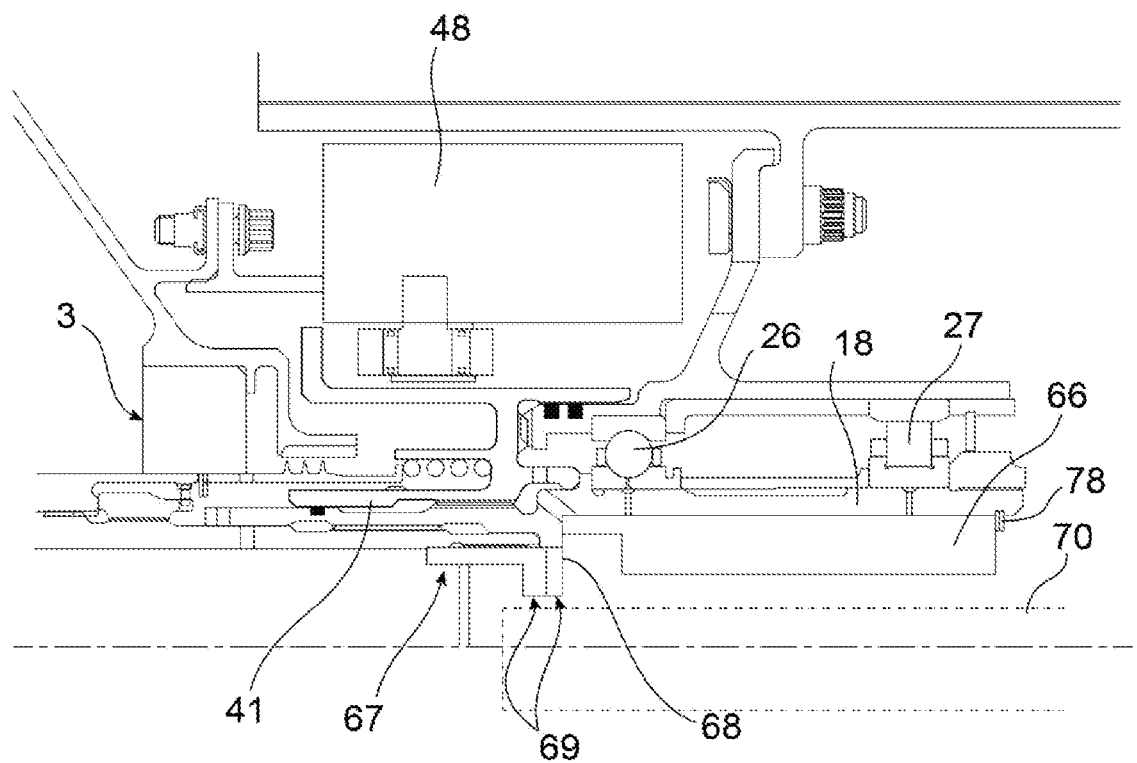
FIG. 6 shows an alternative embodiment.

An alternative embodiment of this part of the device is shown in FIG. 6. The brake 57 is absent, the reservoir 30 occupying the entire empty volume in the shaft segment 18 is replaced by an annular reservoir 66 at the periphery of the empty volume 30. The nut 19 is replaced by a nut 67 and a locknut 68 that lock together. The nut 67 and the locknut 68 have inner radial protrusions 69 which can be gripped by a tool 70, inserted into the shaft segment 18 from the rear as before, to cause tightening and loosening. However, the tool 70 passes through a grease-free volume because the reservoir 66 has larger radii, making it unnecessary to drain in these circumstances. In this embodiment, the cap 20 as well as the nut 67 and the locknut 68 do not need to have a continuous radial wall to close off the empty volume 30. The annular reservoir 66 can be moved backwards here if it has to be extracted from the empty volume, and is otherwise held by a seal 78 housed in a groove of the shaft segment 18.

FIG. 5 shows that a housing of electronic components 71 can be mounted on the stator 13 frame of the electrical machine.

The invention claimed is:

1. A turbomachine comprising:
   a low-pressure shaft extending along an axis (X-X) of the turbomachine which defines a front and a rear;
   a turbomachine stator supporting the low-pressure shaft by bearings including a rear bearing;
   an electrical machine located at a rear portion of the turbomachine and including a rotor disconnectably driven by the low-pressure shaft, and a stator attached to the stator of the turbomachine;
   a journal for supporting the rotor of the electrical machine, the journal including a shaft segment releasably attached to a rear end of the low-pressure shaft by extending the low-pressure shaft, a frame to which the rotor of the electrical machine is attached and which surrounds the shaft segment, wherein the stator of the electrical machine surrounds the rotor of the electrical machine;
   at least one rotary bearing mounted between the frame and the shaft segment; and
   a sleeve that is axially mobile about the low-pressure shaft and/or the shaft segment that is rotationally connected to the low-pressure shaft and the shaft segment, and provided with rearwardly extending coupling device capable of being engaged with forwardly extending complementary coupling device of the frame.

2. The turbomachine according to claim 1, wherein the at least one rotary bearing is lubricated with grease and is contained in an enclosed lubrication chamber.

3. The turbomachine according to claim 2, wherein the shaft segment is hollow and contains a grease reservoir that communicates with the enclosed lubrication chamber via at least one hole.

4. The turbomachine according to claim 1, wherein the rearwardly extending coupling device and the forwardly extending complementary coupling device are networks of radial grooves.

5. The turbomachine according to claim 1, wherein the sleeve is connected to the shaft segment via networks of axial grooves.

6. The turbomachine according to claim 1, comprising an actuator for the sleeve, which is housed axially between the turbomachine stator and the frame, and radially between the frame and the sleeve.

7. The turbomachine according to claim 6, wherein the actuator comprises at least one roller that is axially mobile and rotates freely about a radial axis, capable of abutting against a flat collar of the sleeve and of pushing back the flat collar.

8. The turbomachine according to claim 1, comprising a spring engaged around the low-pressure shaft, and compressed between the low-pressure shaft and the sleeve.

9. The turbomachine according to claim 1, wherein the shaft segment is attached to the rear end of the low-pressure shaft by a nut.

10. The turbomachine according to claim 1, wherein the journal can be separated from the low-pressure shaft and from the sleeve by sliding backwards, the sleeve is attached to the turbomachine stator by a first bolted flange that can be accessed from a rear of the turbomachine, and the stator of the electrical machine is attached to the stator of the turbomachine by a second bolted flange that can be accessed from a rear of the turbomachine.

11. The turbomachine according to claim 1, wherein the journal, the sleeve, and the stator of the electrical machine are formed as separate, unitary modules that can be successively dismantled from the turbomachine.

12. The turbomachine according to claim 11, wherein the actuator is a unitary module, distinct from the stator of the electrical machine module, the journal module and the sleeve module, and
   wherein the actuator can be dismantled from the turbomachine separately from a dismantling of the stator of the electrical machine module, the sleeve module, and the journal module from the turbomachine.

* * * * *